Nov. 8, 1966 H. I. DOBSON 3,284,705

DIRECT-READING CARRIER FREQUENCY IMPEDANCE METER

Original Filed Feb. 13, 1961 14 Sheets-Sheet 1

Herbert I. Dobson INVENTOR.

BY Robert A. Petrusek
Agent

Herbert I. Dobson INVENTOR.

BY Robert A. Petrusek
Agent

Herbert I. Dobson INVENTOR.

BY Robert A. Petrusek
Agent

Nov. 8, 1966 H. I. DOBSON 3,284,705

DIRECT-READING CARRIER FREQUENCY IMPEDANCE METER

Original Filed Feb. 13, 1961

14 Sheets-Sheet 4

Herbert I. Dobson INVENTOR.

BY Robert A. Petrusek
Agent

Herbert I. Dobson INVENTOR.

BY Robert A. Petrusek
Agent

Herbert I. Dobson INVENTOR.

BY Robert A. Petrusek
Agent

Herbert I. Dobson INVENTOR.

BY Robert A. Petrusek
Agent

Herbert I. Dobson INVENTOR.

BY Robert A. Petrusek
Agent

Nov. 8, 1966 H. I. DOBSON 3,284,705

DIRECT-READING CARRIER FREQUENCY IMPEDANCE METER

Original Filed Feb. 13, 1961

14 Sheets-Sheet 9

Herbert I. Dobson INVENTOR.

BY Robert A. Petrusek
Agent

Nov. 8, 1966 H. I. DOBSON 3,284,705

DIRECT-READING CARRIER FREQUENCY IMPEDANCE METER

Original Filed Feb. 13, 1961 14 Sheets-Sheet 10

Herbert I. Dobson INVENTOR.

BY Robert A. Petrusek
Agent

Herbert I. Dobson INVENTOR.

BY Robert A. Petrusek
Agent

Nov. 8, 1966 H. I. DOBSON 3,284,705

DIRECT-READING CARRIER FREQUENCY IMPEDANCE METER

Original Filed Feb. 13, 1961

14 Sheets-Sheet 12

Herbert I. Dobson INVENTOR.

BY Robert A. Petrusek
Agent

Herbert I. Dobson INVENTOR.

BY Robert A. Petrusek
Agent

Nov. 8, 1966 H. I. DOBSON 3,284,705

DIRECT-READING CARRIER FREQUENCY IMPEDANCE METER

Original Filed Feb. 13, 1961

14 Sheets-Sheet 14

Herbert I. Dobson INVENTOR.

BY Robert A. Petrusek Agent 3,284,705
DIRECT-READING CARRIER FREQUENCY IMPEDANCE METER

Herbert I. Dobson, Chattanooga, Tenn., assignor to Tennessee Valley Authority, a corporation of the United States Continuation of application Ser. No. 89,073, Feb. 13, 1961. This application Aug. 23, 1965, Ser. No. 484,786
3 Claims. (Cl. 324—57)

The invention herein described may be manufactured and used by or for the Government for governmental purposes without payment to me of any royalty thereon.

This application is a continuation of my application Serial No. 89,073, filed February 13, 1961, now abandoned.

My inveniton relates to the field of electrical impedance measurements and more particularly to the measurement of the reactive and the resistive components of alternating-current impedances having widely different magnitudes over a wide range of frequencies by direct and rapid methods and means.

Heretofore it has almost universally been the practice in the electronic industry to use bridge-type networks for making impedance measurements. In using such circuits, it is customary to determine the unknown impedance by using a number of variable-impedance standard elements to form three of the arm of a bridge, and to include the unknown impedance as the fourth arm of the bridge. The values of the standard elements are varied until a null appears across the bridge, and then the unknown impedance is determined from the ratios of the standards.

Prior-art arrangements involve the use of a bridge circuit in which the ratio of the resistances of a known impedance Z, in a first leg, and an unknown impedance Z′, in a second leg, to known and variable resistances R and R′ in a third and fourth leg, respectively, are first balanced by varying these variable resistances until the ratio of the resistances is:

$$\frac{Z}{R}=\frac{Z'}{R'}$$

The reactive value of the known impedance to an alternating current is then varied to balance out the reactive value of the unkonwn impedance to said alternating current. Obviously, prior-art arrangements of this type take considerable time, intelligence, time-consuming reading of dials, and mathematical calculations of the ratios involved.

In addition, each such bridge circuit requires a number of precisely made and calibrated variable standard elements including resistors, condensers, and inductors. Its operation, particularly over a wide frequency range, also requires an external signal generator and detector.

My invention is directed to means for measuring impedances which eliminate the need for a bridge circuit and the accompanying variable-impedance elements and supplemental equipment disclosed in the prior art, and which are capable of being applied so as to rapidly, accurately, and directly measure impedances over a wide range of frequencies. My apparatus performs essentially the same service as that provided by an impedance bridge, except that the extreme accuracy of the conventional impedance bridge is sacrificed in my device for highly desirable speed and ease of operation for use as a field instrument on power line carrier circuits and for the desirable ability to measure complex impedances in the presence of interfering signals which seriously hamper the operation of an impedance bridge, or other electronic measuring devices using low-level signals.

I have overcome the difficulties inherent in apparatus of the type in the prior art to a substantial extent in the present invention by providing a circuit so arranged that current flowing from a signal generator will pass through a standard resistance and also through an unknown impendance. The current flowing through the unknown impedance is standardized to produce a voltage drop proportional to the unknown impedance. Elementary circuit principles indicate that the phase angle between the standardized current and the voltage drop across the unknown impedance is the same as the phase angle associated with the unknown impedance. Therefore, separation of this voltage into its real and imaginary vector components while employing the standardized current as reference provides quantities which are directly proportional to the resistive and reactive components of the unknown impedance.

I have discovered means to accomplish this separation with reasonable accuracy over a wide range of frequencies without the necessity for readjusting component values. These quantities are subsequently measured and indicated by the direct reading of an R meter and an X meter. Furthermore, several new and advantageous features over conventional electrical impedance-measuring devices are realized by the present invention.

Among these advantageous features are greatly increased speed and ease by which impedance measurements may be obtained, and greatly decreasd requirements for the ability and skill of the individual operating the measuring apparatus.

Is is therefore an object of the present invention to provide means for measuring carrier frequency impedances with substantially the same ease and rapidity with which resistances are measured with a direct-current ohmmeter.

Another object of the present invention is to provide means by which the resistive and reactive components of impedances may be rapidly and directly read from the deflection of separate meters.

Still another object of the present invention is to provide means capable of the rapid and direct measurements of both the resistive (R) and reactive (X) components of any impedance (one side grounded) from 0 to about 1500 ohms at any carrier frequency from about 40 kilocycles up to about 200 kilocycles.

A further object of the present invention is to provide means capable of the rapid and direct measurements of both the resistance (R) and reactive (X) components of any impedance (one side grounded) from 0 to about 1500 ohms at any carrier frequency from about 40 kilocycles up to about 200 kilocycles, and in which the meter calibration is substantially independent of the carrier frequency over the range from about 40 kilocycles up to about 200 kilocycles.

A still further object of the present invention is to provide a relatively inexpensive impedance meter requiring few adjustments; a provide apparatus which can be used effectively with minimum chance for errors by personnel not very highly skilled; and to provide apparatus with an error of no more than about 3 percent.

In carrying out the objects of my invention in one form thereof, I employ means for dividing a reference voltage proportional to a standard current which is divided into two parts: one maintained "in phase" and the other shifted in phase by 90 degrees with the subsesuent use of square wave gating pulses for the separation of sine wave voltages into both the resistive and the reactive vector components of the unknown impedance.

My invention, together with further objects and advantages thereof, will be better understood from consideration of the following description, taken in connection with the accompanying drawings in which.

Figure 1:
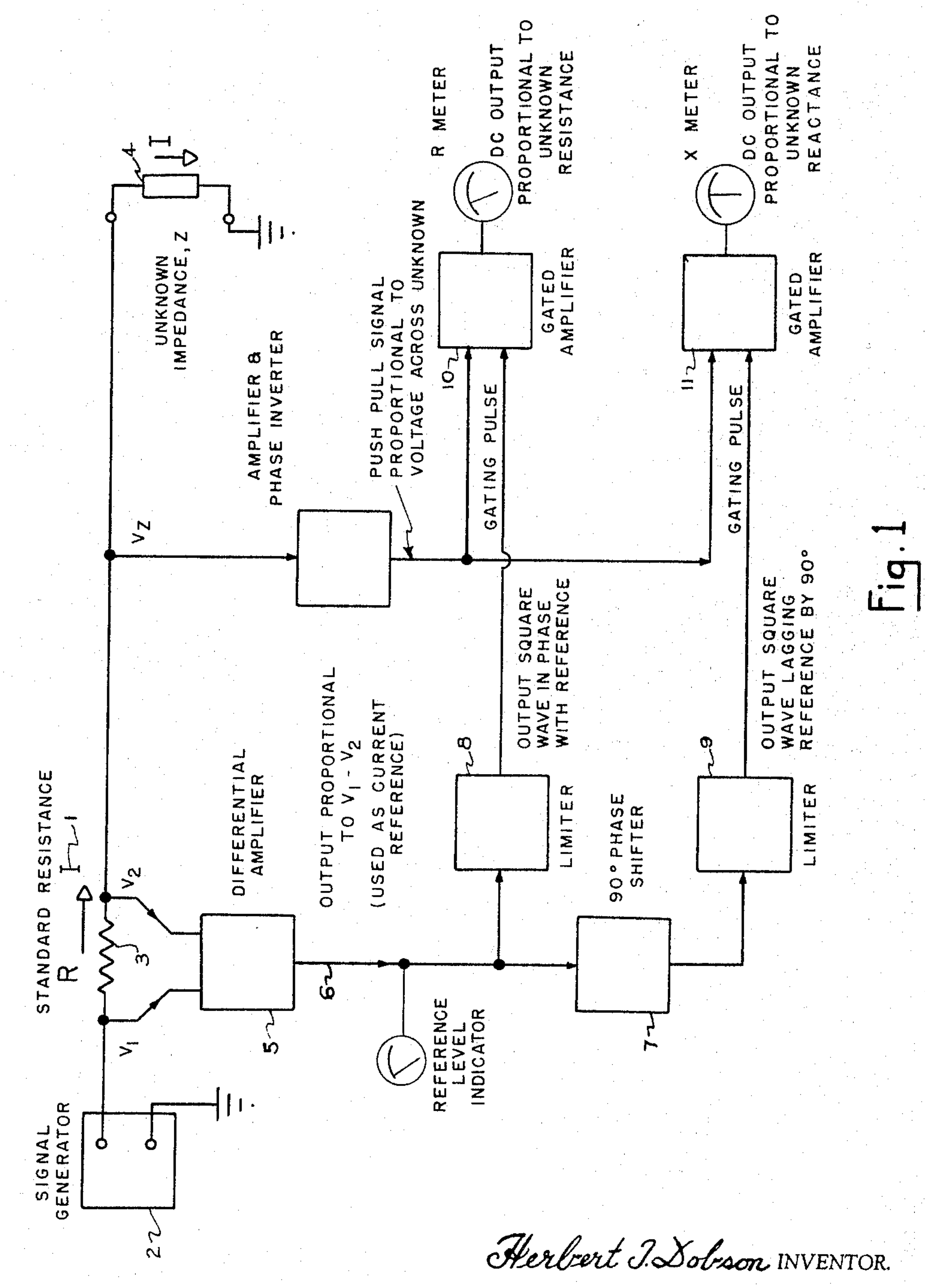
FIGURE 1 is a block diagram of a simplified form of the invention.

Referring now more particularly to FIGURE 1, there is shown in block form a circuit which is arranged so that a current 1 flowing from signal generator 2 will pass through standard resistance 3 and also through unknown impedance 4. Current 1 is adjusted to a predetermined reference value by metering the output of differential amplifier 5. Differential amplifier 5 provides a voltage to ground proportional to the difference between the two input voltages $V_1$ and $V_2$. As is shown, this voltage difference $V_1$ minus $V_2$ is equal to the "IR" drop across standard resistance 3, and the metered ouput therefore is proportional to the reference current 1.

The standard current 1 flowing through unkown impedance 4 will produce a voltage drop proportional to impedance 4. The phase angle between the voltage drop across unknown impedance 4 and reference current 1 will be the same as the phase angle associated with unknown impedance 4. Therefore, separation of the voltage into its real and imaginary components using current 1 as a reference will provide quantities which are directly proportional to the resistive and reactive components of unknown impedance 4.

The aforementioned separation is accomplished as follows: The reference signal 6 from differential amplifier 5 is divided into two parts, one of which is maintained "in phase" and the other part of which is shifted in phase by 90 degrees by means of phase shifter 7. Each of these voltages is amplified and limited by limiters 8 and 9, respectively, to produce square wave signals. These two voltages then are passed through cathode follower amplifiers (not shown) to produce positive pulses. These pulses are of sufficient amplitude that when applied to cathodes of gated amplifier tubes in gated amplifiers 10 and 11 said pulses will cause the tubes to be "cut off" in the presence of each pulse, but will allow said tubes to conduct unhindered between the pulses.

Figure 2:
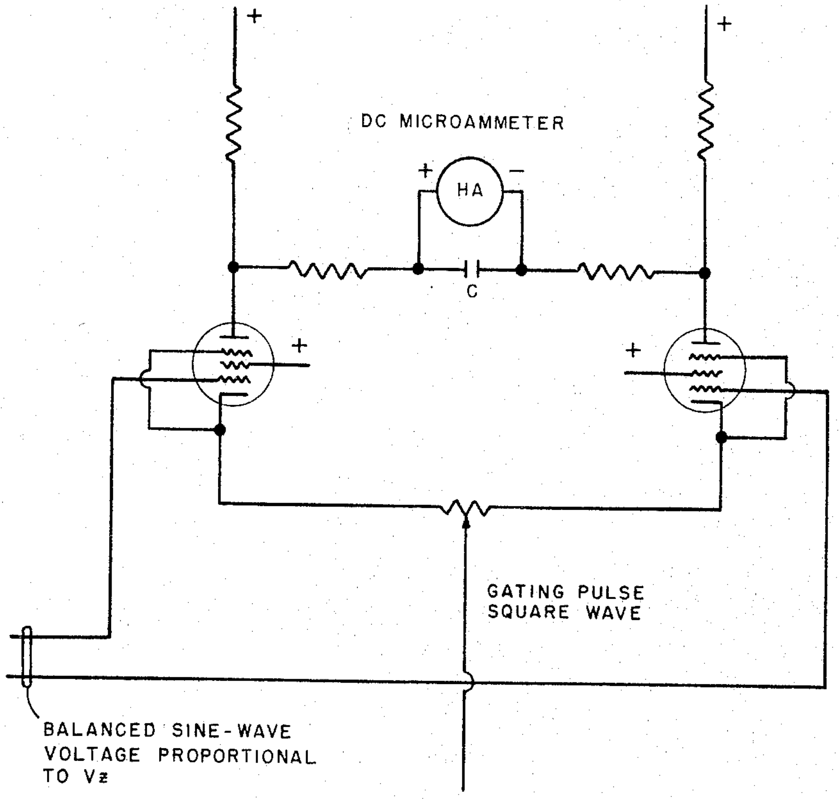
FIGURE 2 is a simplified schematic circuit diagram of one of the two gated amplifiers.

Referring now more particularly to FIGURE 2, there is shown a simplified schematic diagram of a gated amplifier similar to amplifiers 10 and 11. Two pairs of gated amplifiers are used in my invention, one pair being referred to as R meter tubes and the other pair being referred to as X meter tubes. A push-pull sine-wave voltage proportional to the voltage drop across unkown impedance 4 is applied to the grids of each pair of amplifier tubes. Due to the effect of the gating pulses applied to the cathodes of these tubes, each pair of meter tubes will have an output only for alternate half-cycle durations.

Figure 3:
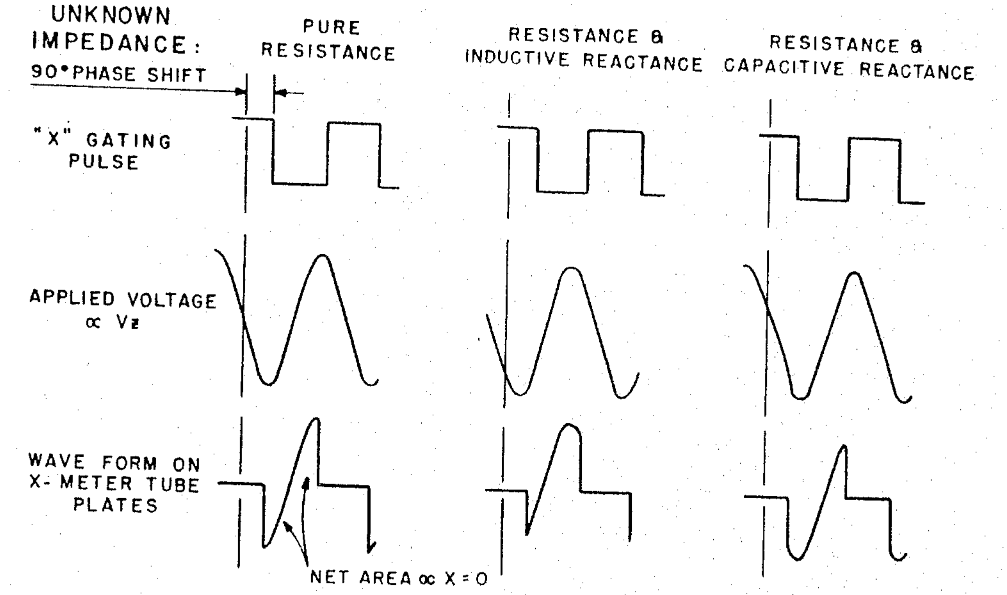
FIGURES 3 and 4 are graphs showing the wave shapes from the gated amplifiers to the R meter and X meter, respectively.
Figure 4:
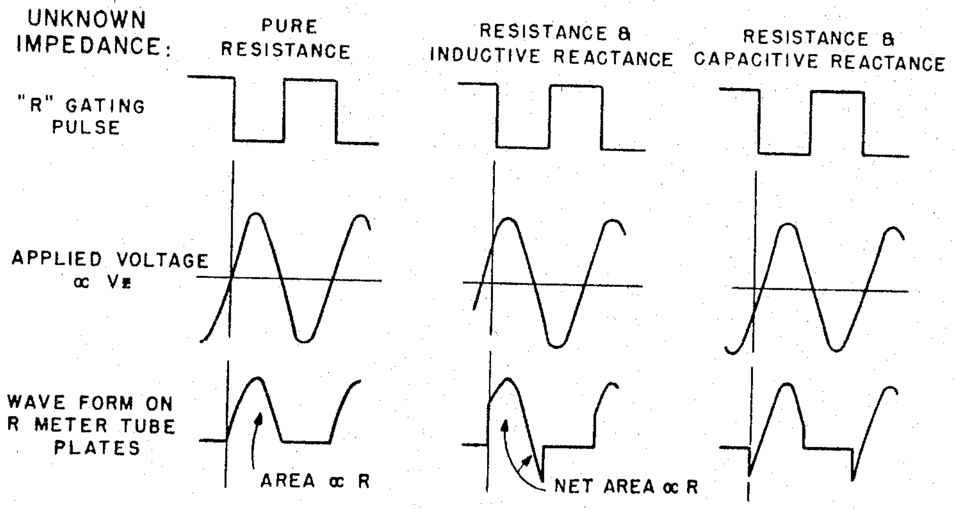

Referring now more particularly to FIGURES 3 and 4, there is shown the resulting geometric patterns produced in the wave forms on the plates of the meter tubes in gated amplifiers 10 and 11. As is indicated, the wave forms contain direct-current components proportional to the net difference in area under the curves above and below the horizontal "zero" axis. When these tubes are cut off by the gating pulse, the output of the meter tubes is shown to fall along the above-mentioned horizontal "zero" axis. Thus, it can be seen that the direct-current microammeter connected in the plate circuit, as is shown in the above-mentioned FIGURE 2, will have a deflection directly proportional to the direct-current component contained in these wave forms. Thus, as can be proven by mathematical calculation, the algebraic sum of the areas under each of these wave forms is directly proportional to each vector component respectively of the applied voltage, and hence the unkown impedance 4.

Figure 5:
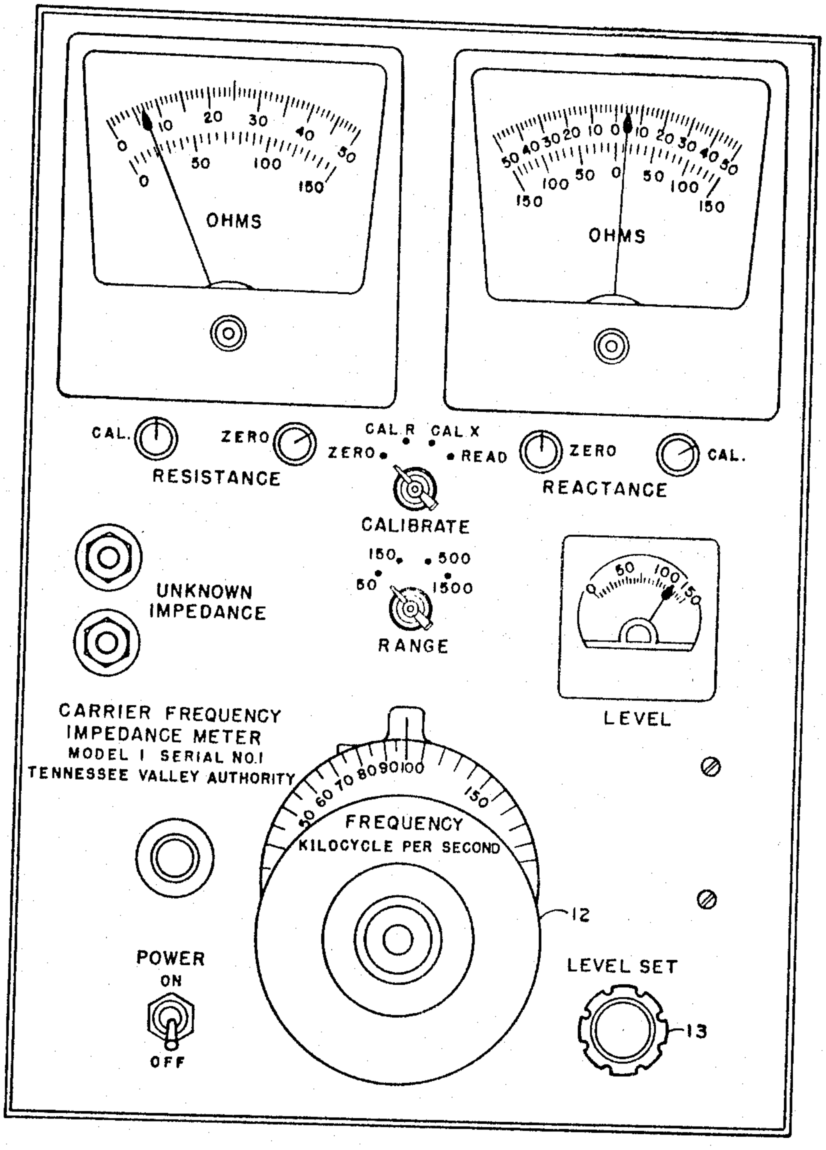
FIGURE 5 is a front elevation of a suitable panel arrangement of the measuring instrument.

With reference to FIGURE 5, operation of my apparatus is accomplised in the following four simple steps.

(*1*) The unknown impedance 4 to be tested is electrically connected with my apparatus.

(*2*) The desired frequency is selected by manipulation of dial 12.

(*3*) The "level" meter is adjusted to full scale by means of gain-control dial 13.

(*4*) Both the resistive and reactive components of unknown impedance 4 are read on the R and X meters.

The apparatus of my invention is self-contained with its own internal power supply and signal generator capable of providing an adequate undistorted power level. As shown, the front panel measures approximately 12 inches wide and 14½ inches high, with the case extending to a depth of approximately 21 inches. The apparatus in its preferred embodiment weighs approximately 50 pounds.

Figure 6:
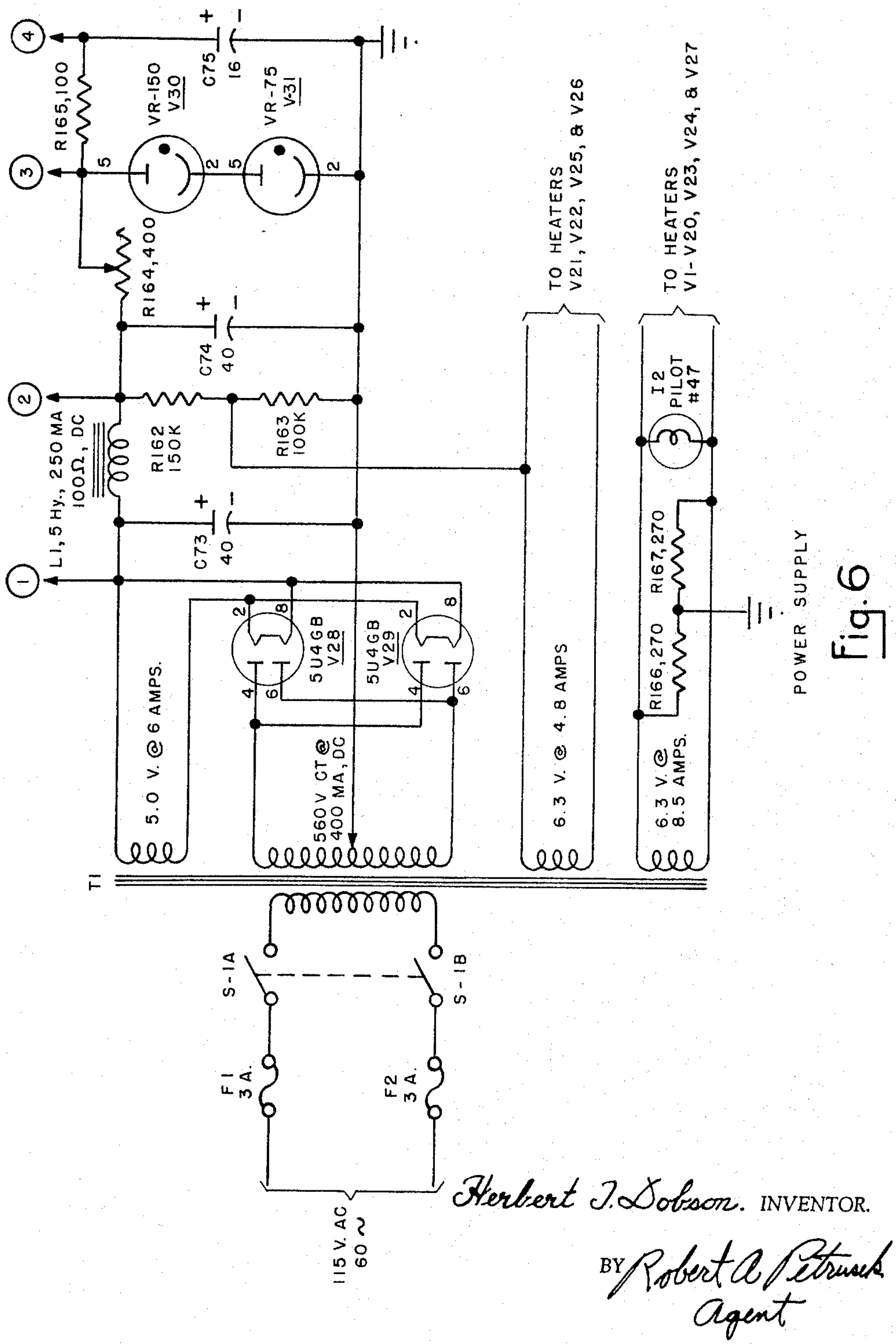
FIGURE 6 shows a diagrammatic view for a conventional type power supply according to one embodiment of my invention.

The power supply shown in diagrammatic view in FIGURE 6 and as used in the preferred embodiment of my invention is of the conventional type. The oscillator shown in FIGURE 7 is of the resistance-capacity type and was selected for the nature of its frequency-determining network so that a variable-frequency phase-shifter could be "ganged" with the frequency dial shaft in order to maintain a constant 90-degree phase shift with a constant amplitude at all frequencies.

With reference to FIGURES 6–15, the power supply, FIGURE 6, provides two regulated and two unregulated sources of d.-C. plate potential. Two filament supplies are also provided—one at ground d.-C. potential for the majority of the tubes, and one at an elevated d.-C. potential for use in the direct-coupled limiter circuits, FIGURES 14 and 15.

Figure 7:
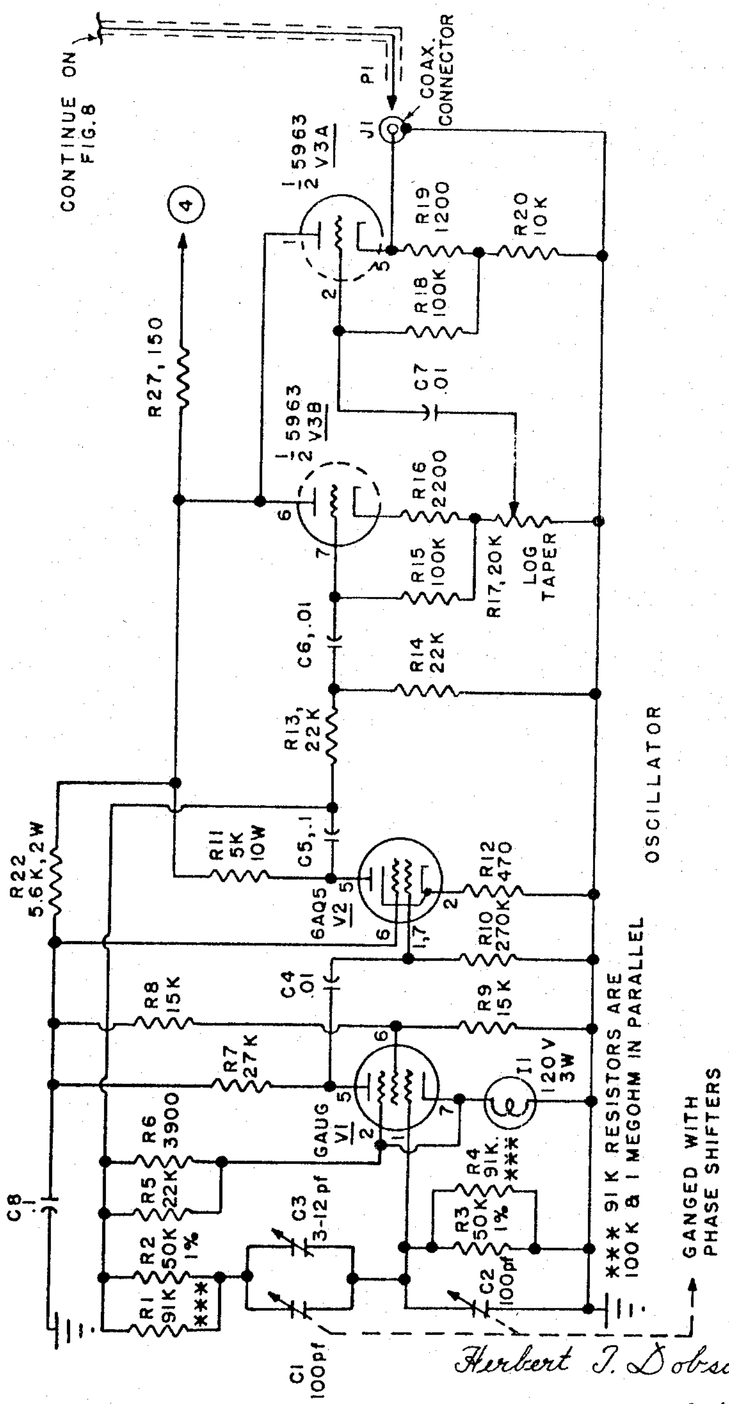
FIGURE 7 is a diagrammatic view of a resistance capacity Wein-Bridge oscillator employed in one embodiment of my invention.

The internal variable-frequency source of alternating current, FIGURE 7, is an oscillator of the Wien bridge type and includes isolating cathode follower stages and a level control available on the front panel of the instrument. The frequency coverage is 40 through 200 kc.

Figure 8:
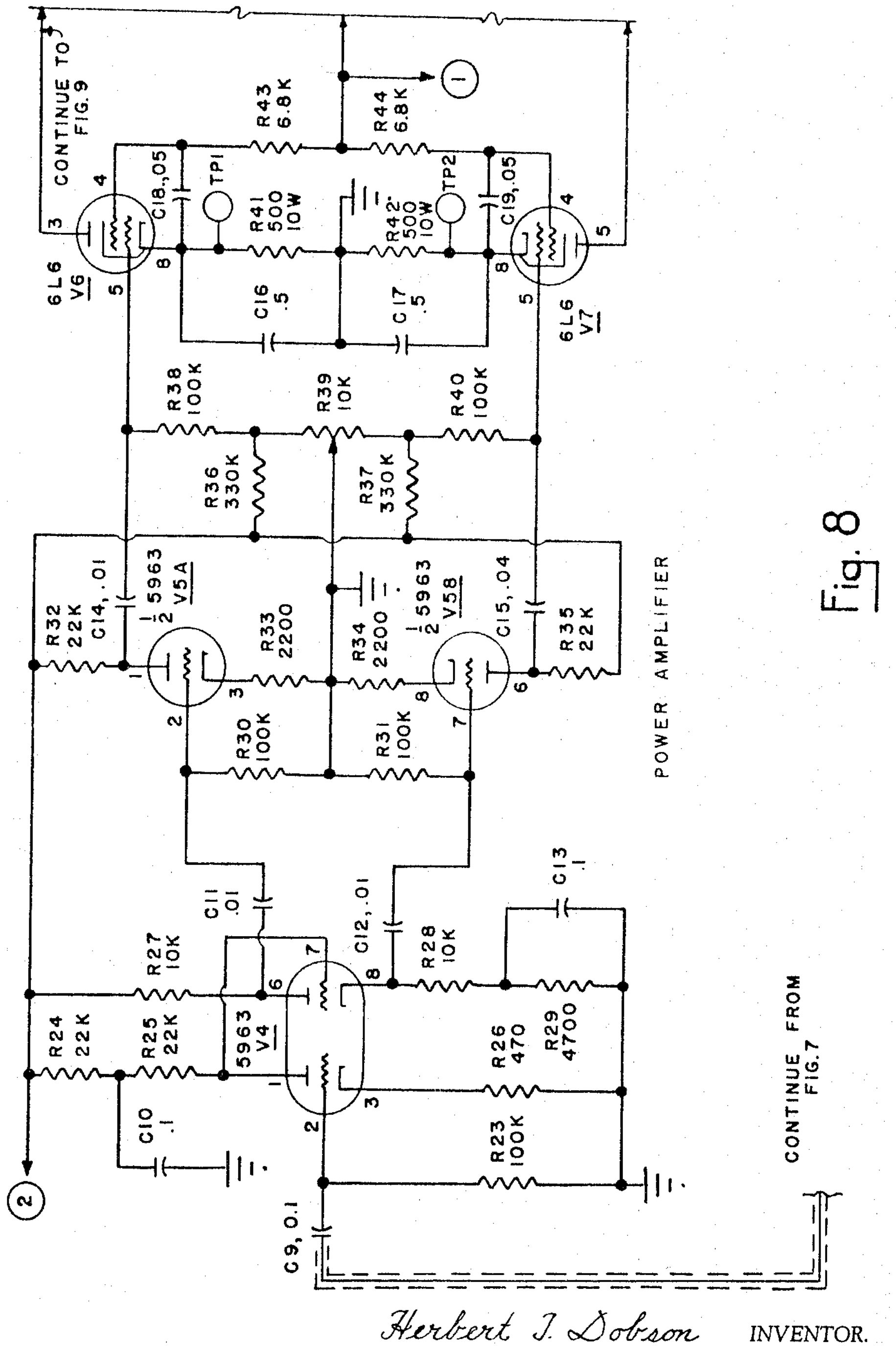
FIGURE 8 is a diagrammatic view of an amplifier for the output signal of the oscillator shown in FIGURE 7.

The output of the oscillator is coupled to the amplifier shown in FIGURE 8. The circuit follows ordinary linear-amplifier techniques and consists of a voltage amplifier, a long-tailed phase inverter, push-pull triode drivers, and push-pull power amplifiers. The amplifier is capable of a 10-watt undistorted ouput at all frequencies within the oscillator range.

Figure 9:
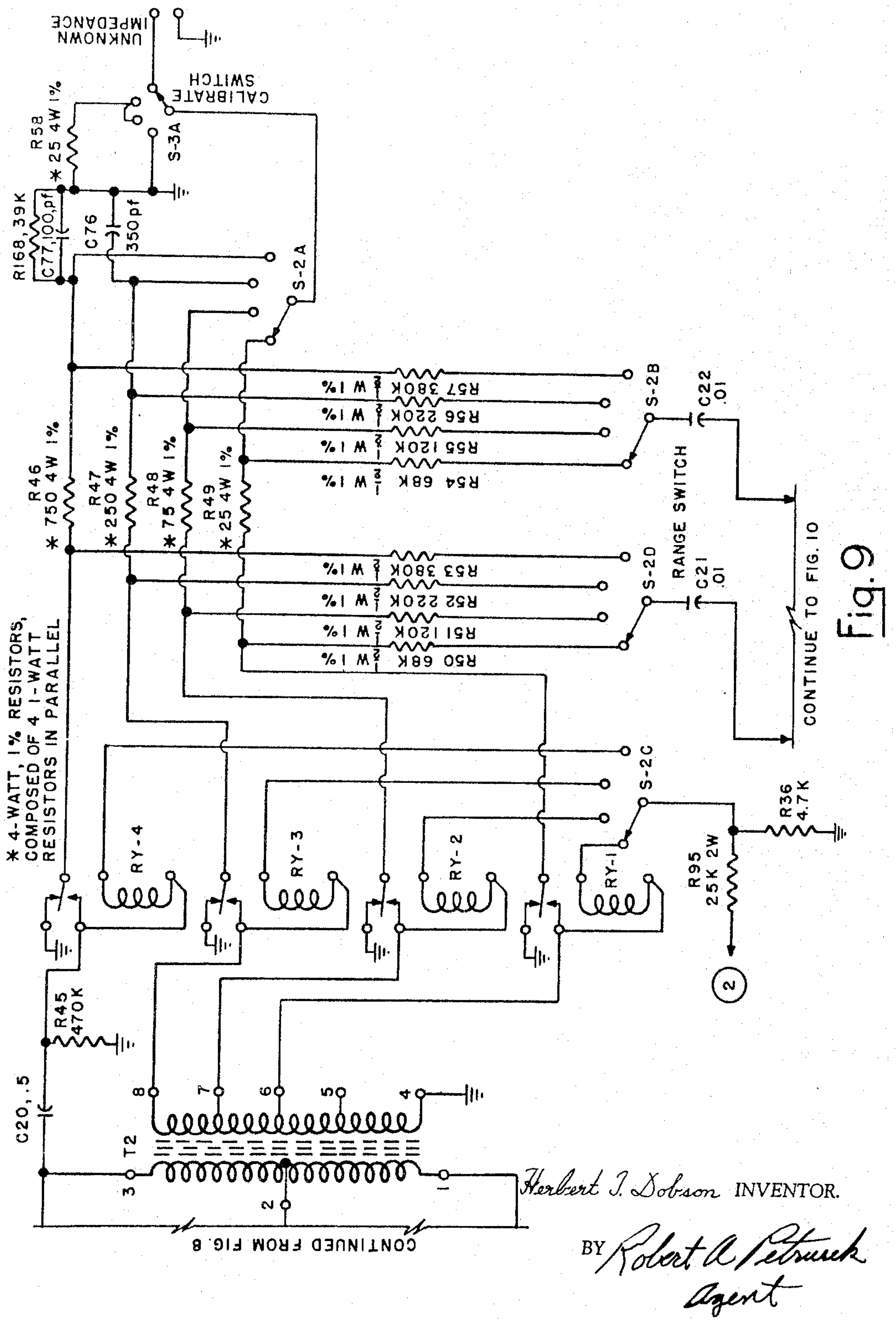
FIGURE 9 is a diagrammatic view showing the means by which the current is provided through the standard resistance and the unknown impedance to be tested in my invention.

The output of the amplifier, FIGURE 9, provides a current through a standard resistance (R46, R47, R48, or R49) and then through the unknown impedance. The range switch, S–2, selects the appropriate standard resistor and voltage dividers for each range. Relays RY–1 through RY-4 are not essential parts of the circuit of FIGURE 9 but serve to minimize wiring capacitance. Resistor R58 serves as a calibrating standard. Resistor R168 and capacitors C76 and C77 are for high-frequency compensation.

Figure 10:
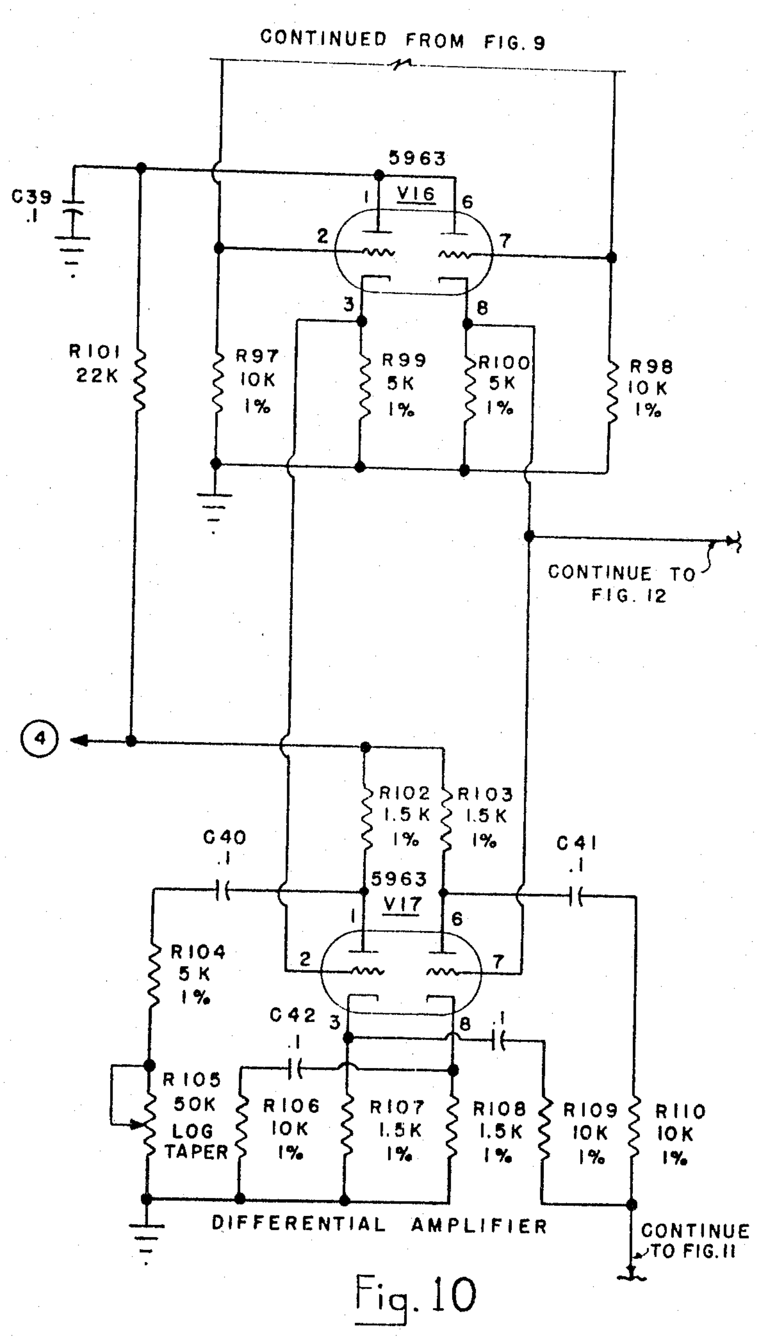
FIGURE 10 is a diagrammatic view of a differential amplifier for the signal from the standard resistor.

The potential on each end of the standard resistor is coupled through range switch S–2B and S–2D to the differential amplifier, FIGURE 10. Dual triode V16 serves as a cathode-follower buffer stage between the measuring points and the differential amplifier, V17. The connection to pin 8 of V16 is wired to the metering amplifier, FIGURE 12, to represent the potential difference across the unknown impedance. The output of the differential amplifier represents the potential drop across the standard resistance and is proportional to the current through the unknown impedance.

Figure 11:
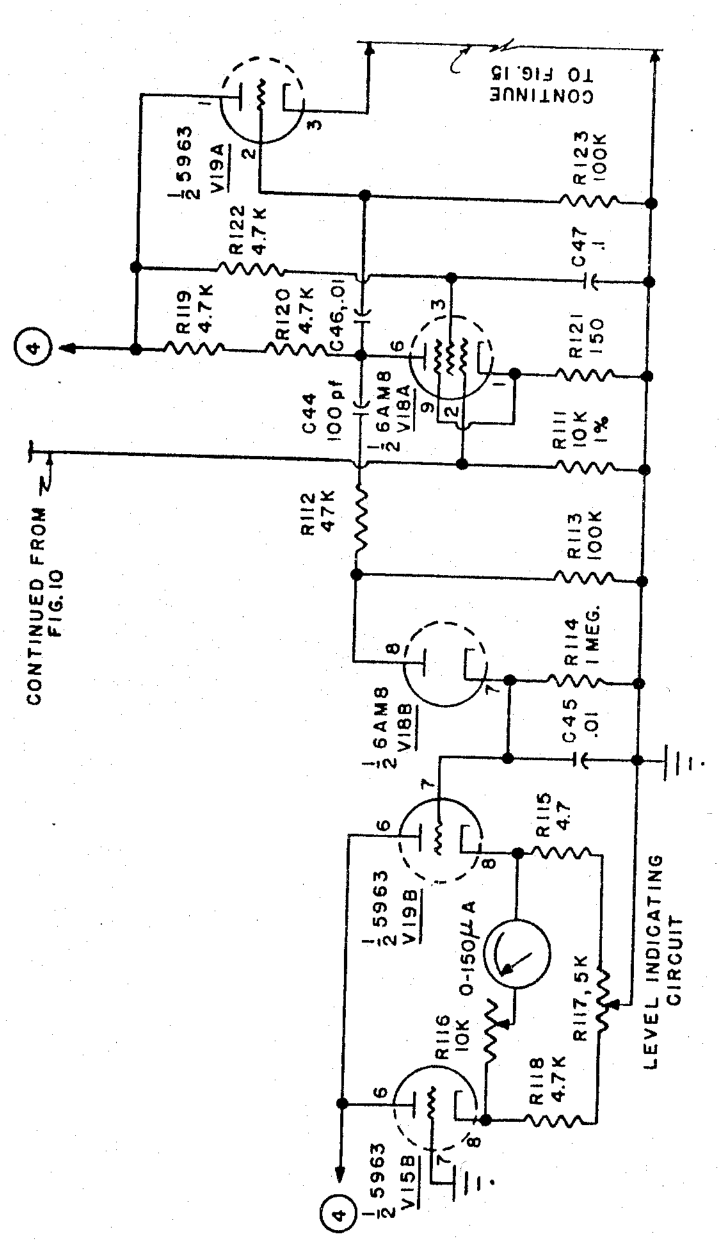
FIGURE 11 is a diagrammatic view of the level indicating circuitry of my invention which provides a front-panel reading of the reference current magnitude.
Figure 15:
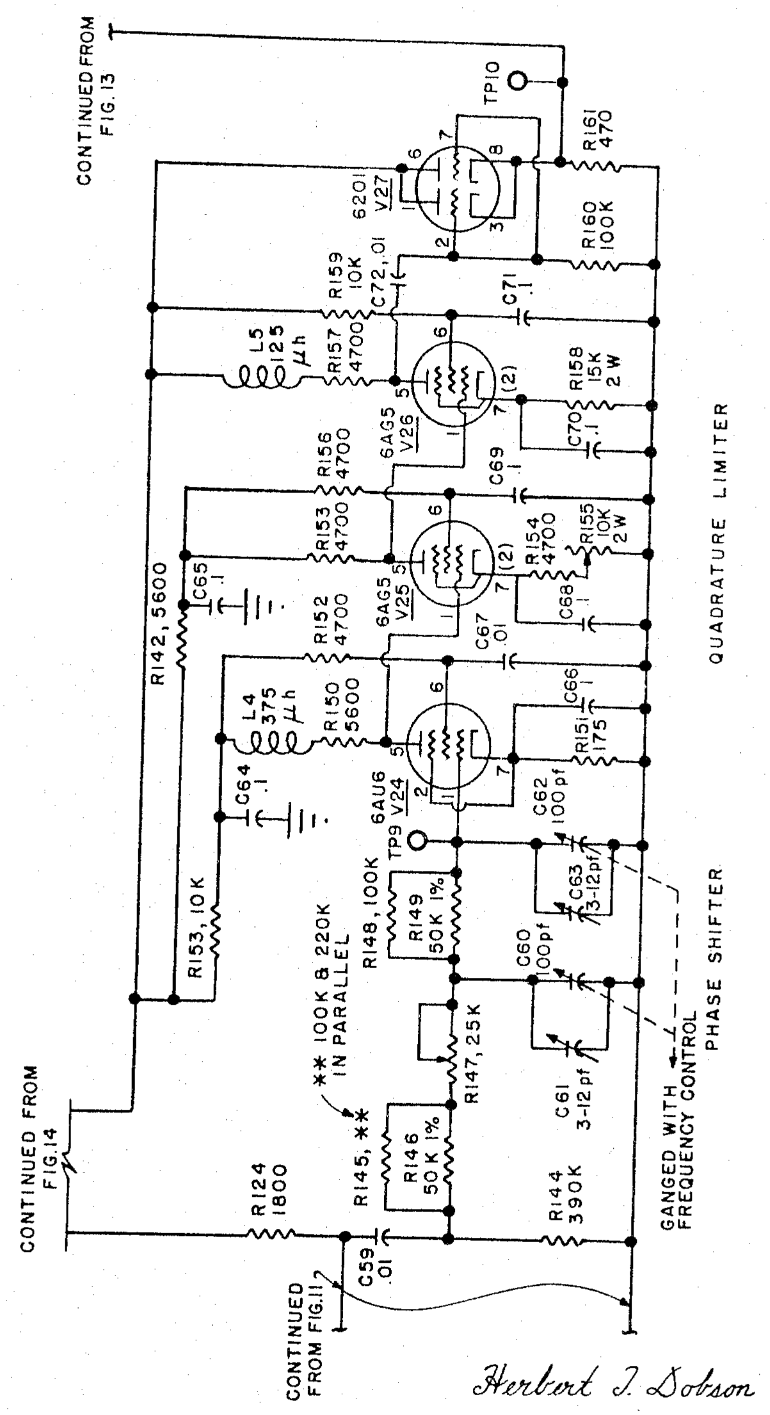
FIGURE 15 is a diagrammatic view of the quadrature limiter and is substantially identical to the limiter shown in FIGURE 14 except that its input is shifted 90 degrees by the phase shifter shown in this figure.

This representation of reference current flow is amplified, FIGURE 11, by V18A and coupled to the limiter circuits via cathode follower V19A and a current division through R124 and C59 (shown in FIGURE 15). The level indicating circuit, operating via rectifier V18B, provides a front-panel reading of reference-current magnitude.

Figure 12:
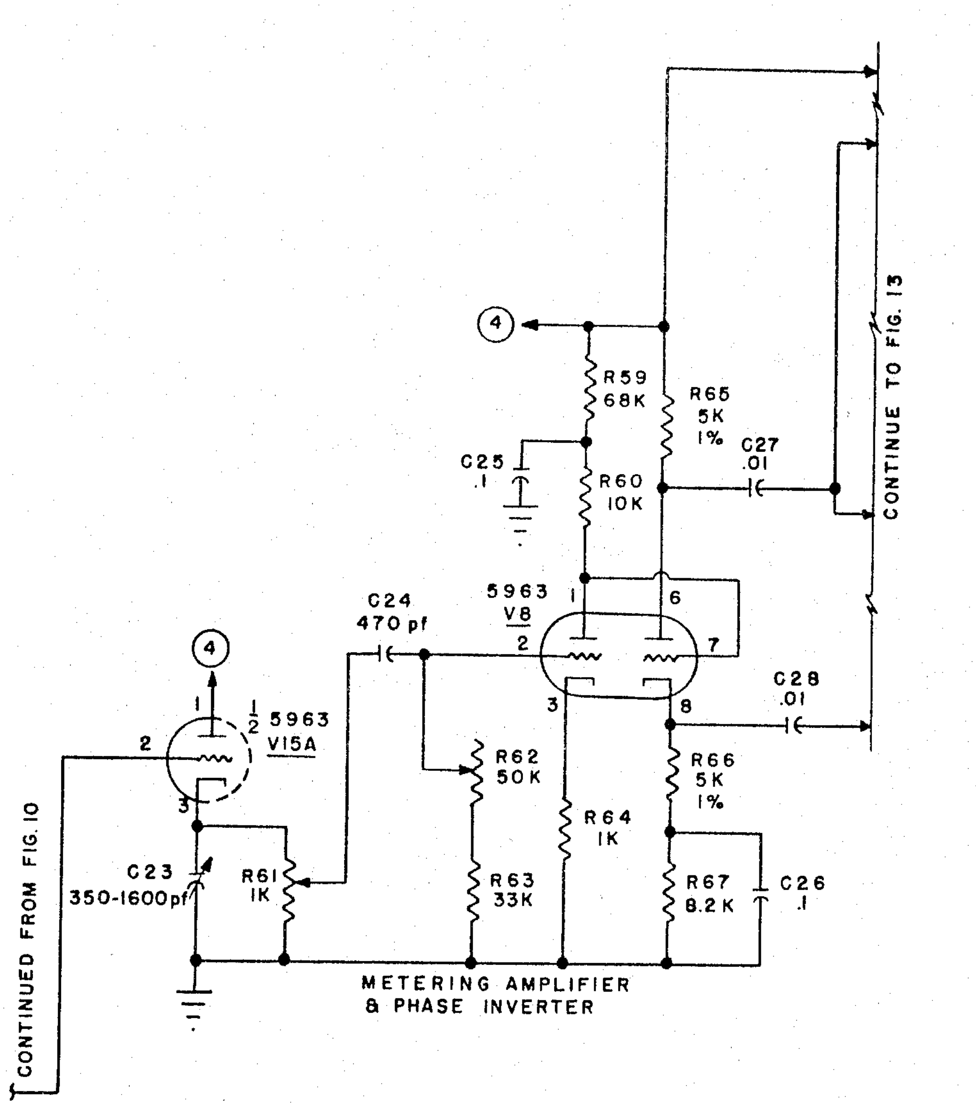
FIGURE 12 is a diagrammatic view of the metering amplifier and phase converter according to one embodiment of my invention.
Figure 13:
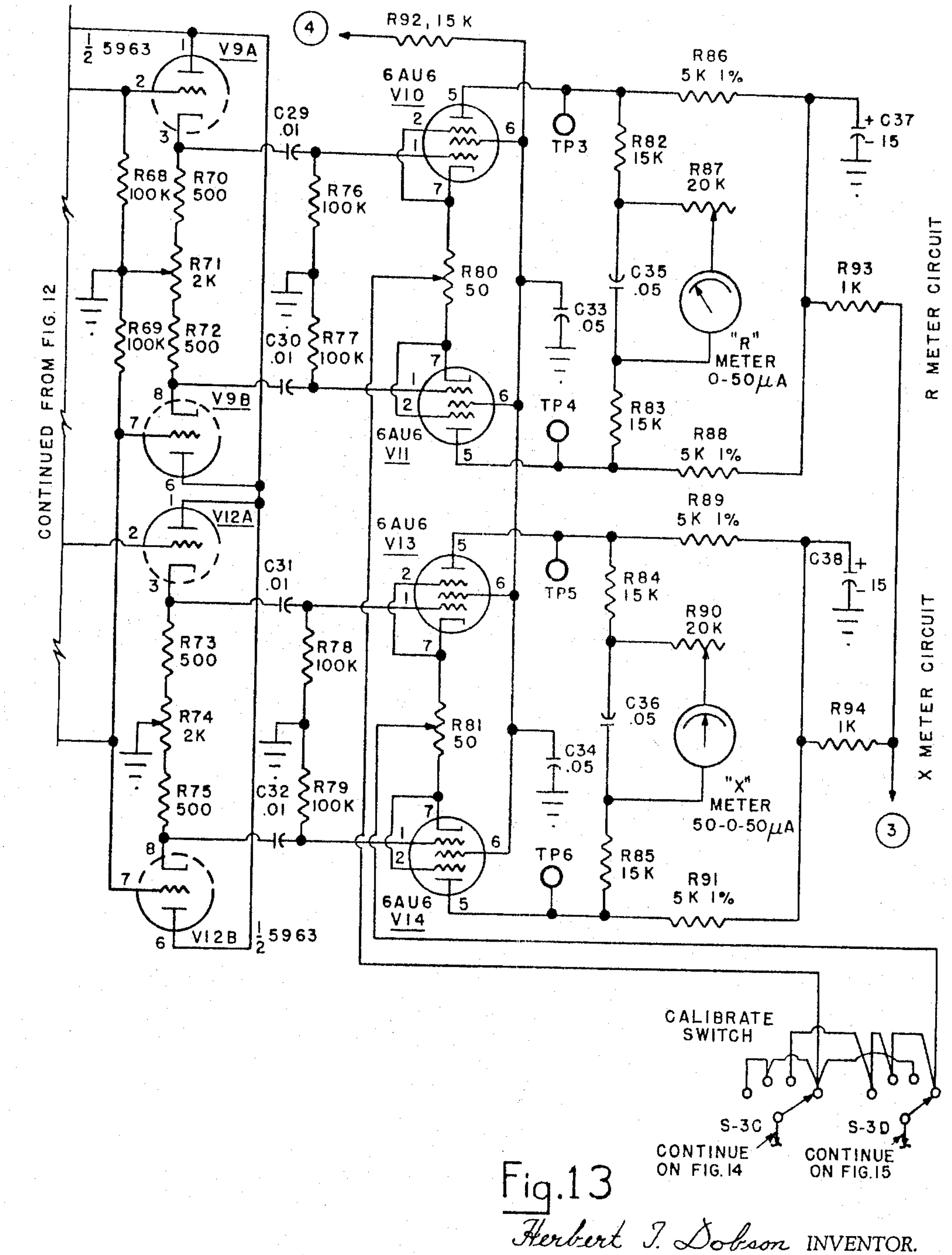
FIGURE 13 is a diagrammatic view of the gated-amplifier meter circuits which are driven by the metering amplifier shown in FIGURE 12.

FIGURE 12 shows the metering amplifier and the phase inverter, V8, which drives the gated-amplifier meter circuits, FIGURE 13. The output of V8 through C27 and C28 divides to form two balanced circuits in parallel, one for each meter circuit. Dual triodes, V9 and V12, respectively, in FIGURE 13, serve as cathode-follower drivers to provide low-impedance sources for the push-pull gated amplifiers.

Figure 14:
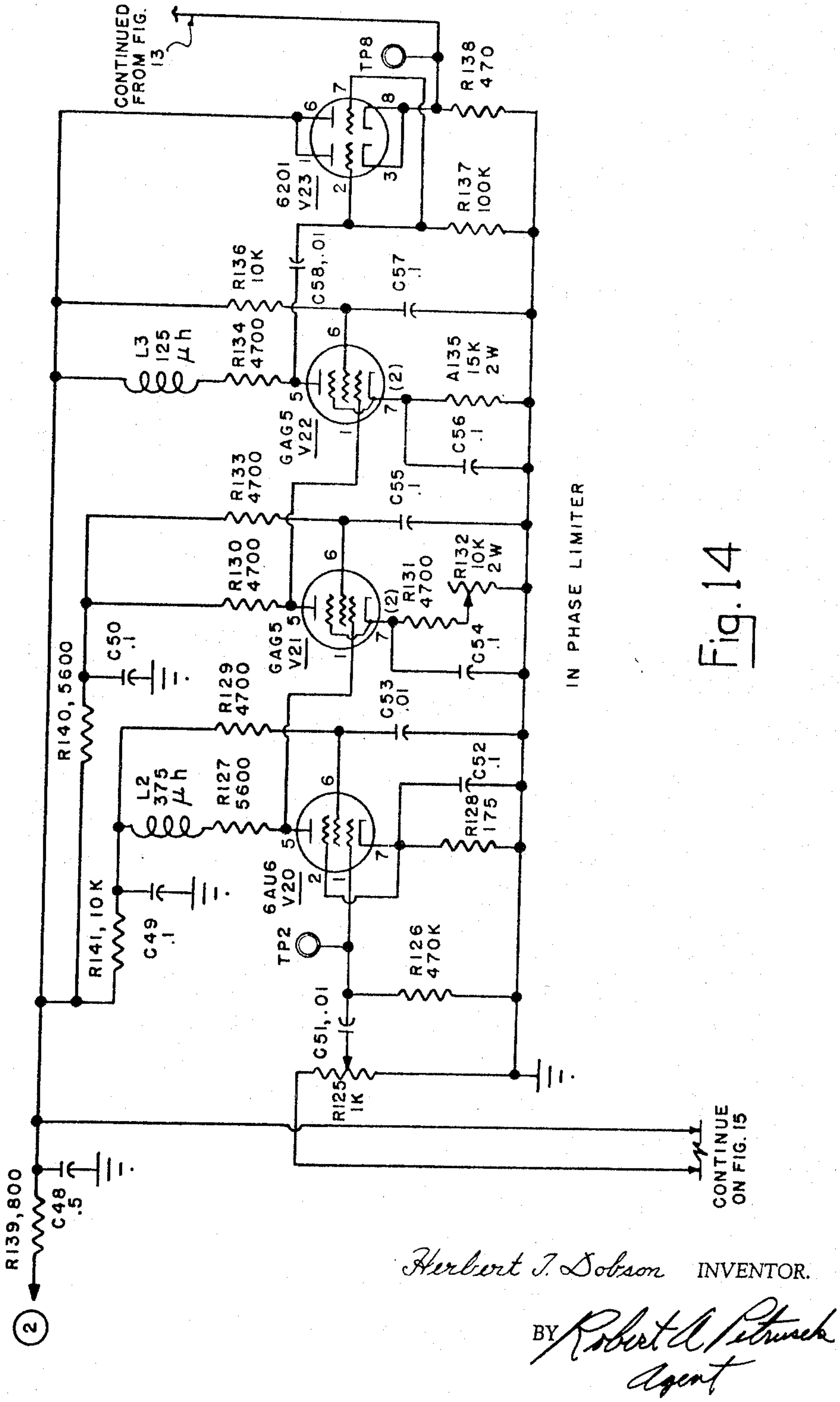
FIGURE 14 is a diagrammatic view of the "in-phase" limiter which acts as the wave-shaping means according to my invention.

FIGURE 14 shows the "in-phase" limiter whose function is to provide a square-wave gating pulse (wave-shaping means) in phase with the reference current. Its input comes from the reference output of the amplifier in FIGURE 11 (via a connection shown on FIGURE 15). The input signal is amplified by V20. V21 and V22 are driven well into the saturation range to produce symmetrical square waves which are coupled through V23 to the cathodes of the "R" meter tubes, V10 and V11, FIGURE 13.

The quadrature limiter, FIGURE 15, is identical to the limiter in FIGURE 14 except that its input is shifted 90 degrees by the phase shifter on FIGURE 15. The phase shifter consists of two sections of resistance-capacitance, R145–149 and C60–63, inclusive. C60 and C62 are variable capacitors on a common shaft with the capacitors which control the oscillator frequency (FIGURE 7). This permits a constant impedance, i.e., the capacitance is automatically varied so that its reactance is the same at every frequency. Resistor R147 and capacitors C61 and C63 provide adjustments for low-frequency and high-frequency phase shift, respectively. The output of the quadrature limiter is coupled through V27 to the cathodes of the "X" meter tubes, V13 and V14, FIGURE 13.

The calibrating switch sections, S–3C and S–3D, FIGURE 13, permit the in-phase and quadrature gating pulses to be exchanged so that the "X" meter circuit can be calibrated with the same reistance as to the "R" meter circuit. The operation of this circuitry will be readily apparent from the above description of the operation of the meter in conjunction with the block diagrams.

While I have shown and described particular embodiments of my invention, modifications and variations thereof will occur to those skilled in the art, such as different or extended ranges of frequency and impedance or modification to permit measurement of balanced (ungrounded) as well as unbalanced (one side grounded) impedances. I wish it to be understood, therefore, that the appended claims are intended to cover such modifications and variations which are within the true scope and spirit of my invention.

What I claim as new and desire to secure by Letters Patent of the United States is:

1. A direct-reading carrier frequency impedance meter consisting of an internal variable-frequency source of alternating current, a standard resistance unit, external terminals for connecting an unknown complex impedance in series with said current source and said resistance unit, the impedance values of said resistance unit and said unknown impedance being of comparable magnitude, differential-amplifier means connected across said standard resistance unit, the output of said differential-amplifier means providing a reference proportional to the current through said standard resistance unit, reference-level indicating means connected with the output of said differential-amplifier means; current-dividing means connected in series with said differential-amplifier means for providing parallel electrical circuits A and B; a 90-degree phase-shifting device for variable frequencies in said B circuit, said phase-shifting device consisting of two R-C sections in which there is a 45-degree phase shift each, said R-C sections each containing a variable capacitor the control means of which is ganged with the control means of said internal variable-frequency source of alternating current in a manner such that there is a dependent and inversely proportional relationship between the capacitance of each of said variable capacitors and the frequency of said internal variable-frequency source of alternating current, whereby the reactive impedance of said variable capacitors is maintained constant throughout the operating range of said control means of both said internal variable-frequency source of alternating current and said variable capacitors in said R-C sections; wave-shaping means in each of said A and B circuits energized by current in said respective A and B circuits for producing a succession of square waves having a duration of one-half alternating-current cycle and spaced by intervals of one-half alternating-current cycle; amplifying and phase-inverting means for deriving a push-pull signal proportional to the voltage drop across said unknown complex impedance; current-dividing means connected in series with said amplifying and phase-inverting means for providing parallel push-pull circuits C and D; gated-amplifier means in each of said C and D circuits, the cathodes of said gated-amplifier means in said C circuit being connected to the square-wave voltage derived from said A circuit, and the cathodes of said gated-amplifier means in said D circuit being connected to the square-wave voltage derived from said B circuit; a first direct-current microammeter electrically connected in the plate circuit of the gated-amplifier means in said C circuit whereby the deflection of said microammeter by the direct-current component in the output of said gated-amplifier means in the C circuit is directly proportional to the resistance of said unknown complex impedance; a second direct-current microammeter having a zero-center scale electrically connected in the plate circuit of the gated-amplifier means in said D circuit whereby the positive and negative deflection of said zero-centered microammeter by the direct-current component in the output of said gated-amplifier means in the D circuit is directly proportional to the inductive and capacitive reactance respectively of said unknown complex impedance.

2. Apparatus as defined in claim 1 wherein said internal variable-frequency source consists of an oscillator and a 10-watt power amplifier supplying a substantial magnitude of undistorted alternating current through said standard resistance unit and said unknown complex impedance, including a manual control for maintaining said current at a constant standard reference value.

3. Apparatus as defined in claim 2 wherein said 90-degree phase shifting device provides an output voltage which is constant in amplitude and phase relation to input throughout the entire frequency range without readjustment.

(References on following page)

References Cited by the Examiner

UNITED STATES PATENTS

| | | | |
|---|---|---|---|
| 2,576,059 | 11/1951 | Wojciechowski | 324—57 |
| 2,592,750 | 4/1952 | Selove | 324—57 |
| 2,595,675 | 5/1952 | Jayneo | 324—57 |
| 2,683,858 | 7/1954 | Hersh et al. | 324—57 |
| 2,735,292 | 2/1956 | Salzberg | 324—57 |
| 2,793,292 | 5/1957 | Wolff | 324—57 X |

RUDOLPH V. ROLINEC, *Primary Examiner.*

WALTER L. CARLSON, *Examiner.*

A. E. RICHMOND, *Assistant Examiner.*